(12) United States Patent
Williams et al.

(10) Patent No.: US 6,957,853 B2
(45) Date of Patent: Oct. 25, 2005

(54) VEHICLE SEATING APPARATUS

(75) Inventors: Jeffrey R. Williams, Davenport, IA (US); Dale Ropp, Buda, IL (US)

(73) Assignee: Sears Manufacturing Co., Davenport, IA (US)

( * ) Notice: Subject to any disclaimer, the term of this patent is extended or adjusted under 35 U.S.C. 154(b) by 66 days.

(21) Appl. No.: 10/405,997

(22) Filed: Apr. 2, 2003

(65) Prior Publication Data

US 2004/0195867 A1 Oct. 7, 2004

(51) Int. Cl.[7] .............................................. B60N 2/02
(52) U.S. Cl. ............................................. 297/93; 297/94
(58) Field of Search ............................. 297/92, 93, 94, 297/344.1; 248/421, 425, 564, 584, 588, 280.11, 292.11

(56) References Cited

U.S. PATENT DOCUMENTS

| | | | | | |
|---|---|---|---|---|---|
| 2,784,768 | A | * | 3/1957 | Holopainen | 297/93 |
| 3,246,926 | A | * | 4/1966 | Link | 297/93 |
| 3,300,172 | A | * | 1/1967 | Noller et al. | 248/425 |
| 3,964,785 | A | | 6/1976 | Plume | |
| 4,072,343 | A | * | 2/1978 | Meza | 297/93 |
| 4,241,893 | A | * | 12/1980 | Koutsky et al. | 248/425 |
| 5,584,460 | A | * | 12/1996 | Ropp | 248/423 |
| 5,957,426 | A | * | 9/1999 | Brodersen | 248/588 |

FOREIGN PATENT DOCUMENTS

| | | |
|---|---|---|
| GB | 1552437 | 9/1979 |
| JP | 2002201843 | 7/2002 |

OTHER PUBLICATIONS

British search rep., filed Jul. 14, 2004.
John Deere Parts Catalog (pp. 90–8 to 90–13) PC 2914 Apr. 2 "110 Tractor Loader Backhoe".

* cited by examiner

*Primary Examiner*—Peter M. Cuomo
*Assistant Examiner*—Stephen Vu
(74) *Attorney, Agent, or Firm*—Niro, Scavone, Haller & Niro (57) ABSTRACT

A vehicle seating apparatus has first and second seat suspensions and a seat assembly. The first seat suspension is located at a first longitudinal location on the vehicle and incorporates a first seat platform having a pair of seat brackets. The second seat suspension is located at a second longitudinal location on the vehicle and incorporates a second seat platform having a fixed pivot bracket. The seat assembly has first and second occupant support members, a pivot rod mounted to the support members, and at least one latch cam connected to the pivot rod. Each of the seat brackets cooperates with the seat assembly pivot rod and to permit rotation of the seat assembly from a first to a second orientation. In the first orientation the seat occupant faces one end of the vehicle. In the second orientation the seat suspension and the seat occupant faces the other end of the vehicle. As the seat assembly rotates from the first orientation to the second orientation the latch cam on the seat assembly pivot rod engages the second seat suspension pivot bracket.

4 Claims, 7 Drawing Sheets

VEHICLE SEATING APPARATUS

BACKGROUND OF THE INVENTION

The present invention relates generally to vehicular seating and, more particularly, to a dual purpose or reversible seating apparatus that permits the vehicle operator to occupy a seat in the vehicle in either of two positions, each facing toward an opposite end of the vehicle.

A variety of multipurpose vehicles are now in commercial use. Among the most popular of such multipurpose vehicles is earth moving equipment having an earth loader operating from one end and a backhoe operating at the other. Because the vehicle cab which houses the operator is relatively small in at least some of these loader/backhoe vehicles, it is advantageous to equip the vehicle with only a single seating apparatus which the operator can easily orient to face toward either end of the vehicle. One prior art apparatus is known which attempts to meet this need by rotating the seat about a horizontal axis; that is, the seat may be "flipped" from a loader orientation to a backhoe orientation. There are, however, disadvantages associated with this prior art device, and the present invention represents an improvement over this known "flip over" arrangement.

SUMMARY OF THE INVENTION

The present invention is directed to a vehicle seating apparatus which permits the operator of the vehicle to occupy a seat in the vehicle in either of two positions, each facing toward an opposite end of the vehicle. The vehicle seating apparatus comprises first and second seat suspensions and a seat assembly. The first seat suspension is located at a first longitudinal location on the vehicle and incorporates a first seat platform having a pair of seat brackets. The first seat platform is movable both vertically and in the fore/aft direction. The second seat suspension is located at a second longitudinal location on the vehicle and incorporates a second seat platform having a fixed pivot bracket. The seat assembly has first and second occupant support members, a pivot rod mounted to the support members, and at least one latch cam connected to the pivot rod. Each of the seat brackets has a pivot rod aperture to cooperate with the seat assembly pivot rod and to permit rotation of the seat assembly from a first to a second orientation. In the first orientation the seat assembly cooperates with the first suspension and the seat occupant faces one end of the vehicle. In the second orientation the seat assembly cooperates with the second seat suspension and the seat occupant faces the other end of the vehicle. As the seat assembly rotates from the first orientation to the second orientation the latch cam on the seat assembly pivot rod engages the second seat suspension pivot bracket. Finally, the pivot rod apertures in the seat brackets are configured to permit vertical and/or horizontal movement of the seat assembly relative to the first seat platform.

It is accordingly an object of the invention to provide a vehicle seat apparatus wherein the seat has first and second orientations and wherein the seat, in the first orientation, is supported by a suspension having a measure of isolation from vertical forces and fore/aft adjustment.

Another object of the invention is to provide a vehicle seat apparatus wherein, in one orientation, the seat accommodates both vertical and fore/aft movement, while in the second orientation the seat is in a fixed position.

A further object of the present invention is to provide a dual orientation vehicle seat apparatus having separate mounting suspensions.

A still further object of the invention is to provide a vehicle seat apparatus with the above-mentioned functionality and which is, nonetheless, simple in design and relatively inexpensive to manufacture.

Another object of the invention is to provide a dual orientation vehicle seat apparatus wherein the seat is locked in position in either of the two orientations, yet may be easily disengaged by an operator located at either of the two orientations.

BRIEF DESCRIPTION OF THE DRAWINGS

The novel features which are characteristic of the present invention are set forth in the appended claims. However, the aforementioned objects, together with further objects and attendant advantages, will become apparent from the following description of the preferred embodiments taken in connection with the accompanying drawings wherein like reference numerals represent like elements in the several views, and in which:

DETAILED DESCRIPTION OF THE PREFERRED EMBODIMENTS

Figure 1:
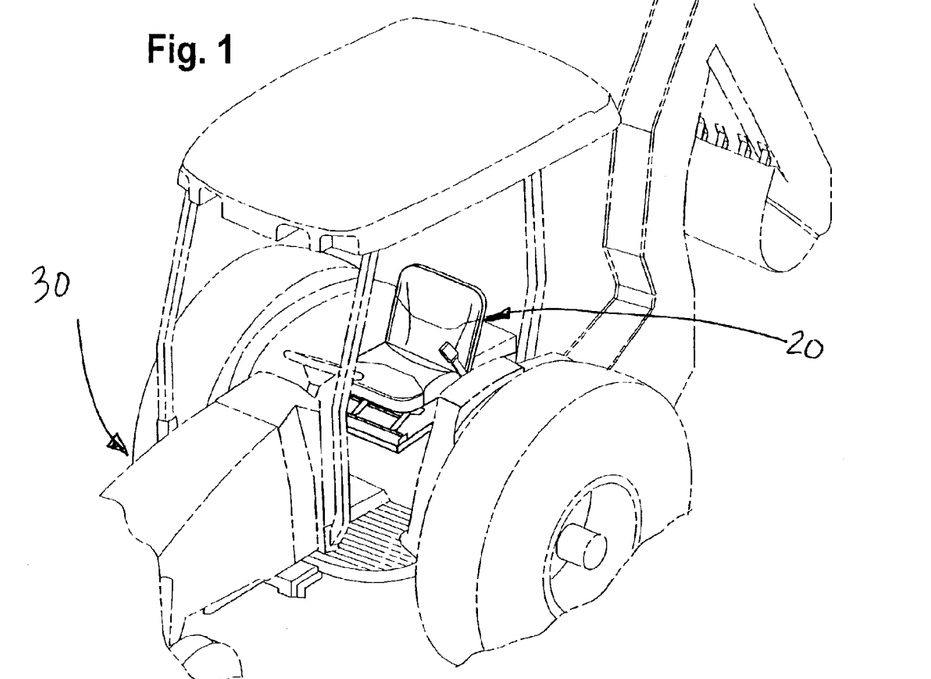
FIG. 1 is a partial perspective view of a dual purpose vehicle showing the seat apparatus facing the loader end of the vehicle.
Figure 2:
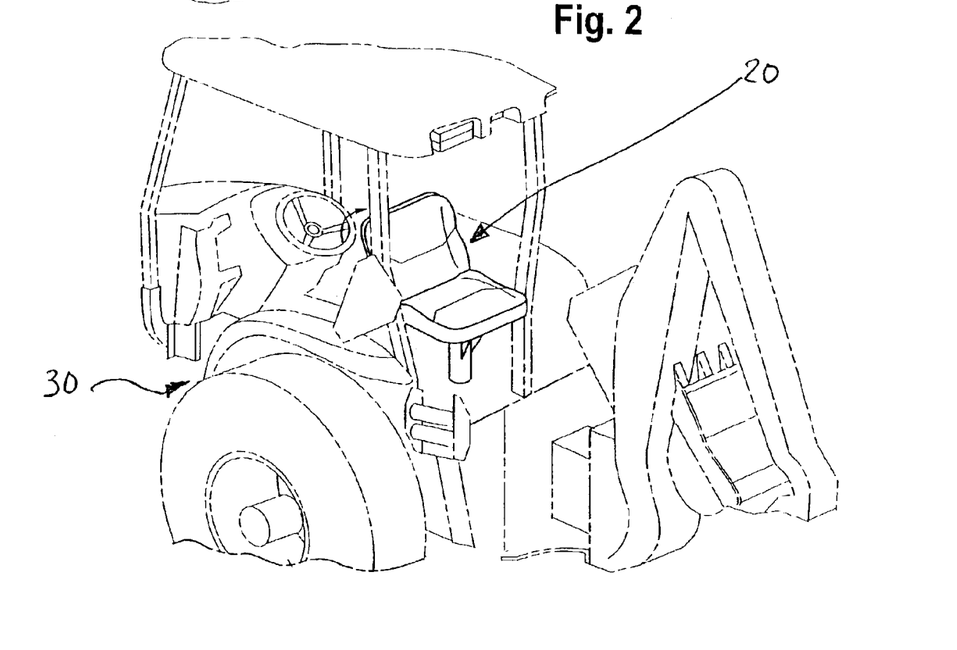
FIG. 2 is another partial perspective view of the same dual purpose vehicle as shown in FIG. 1 but showing the seat apparatus facing the backhoe end of the vehicle.
Figure 3:
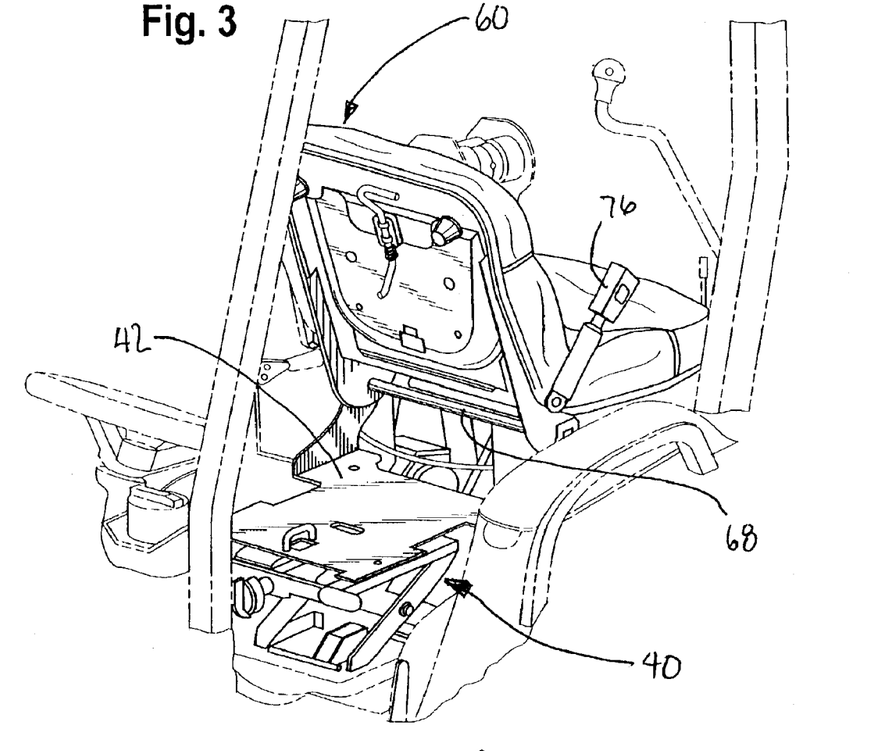
FIG. 3 is a perspective view showing details of the first suspension and the seat assembly.
Figure 4:
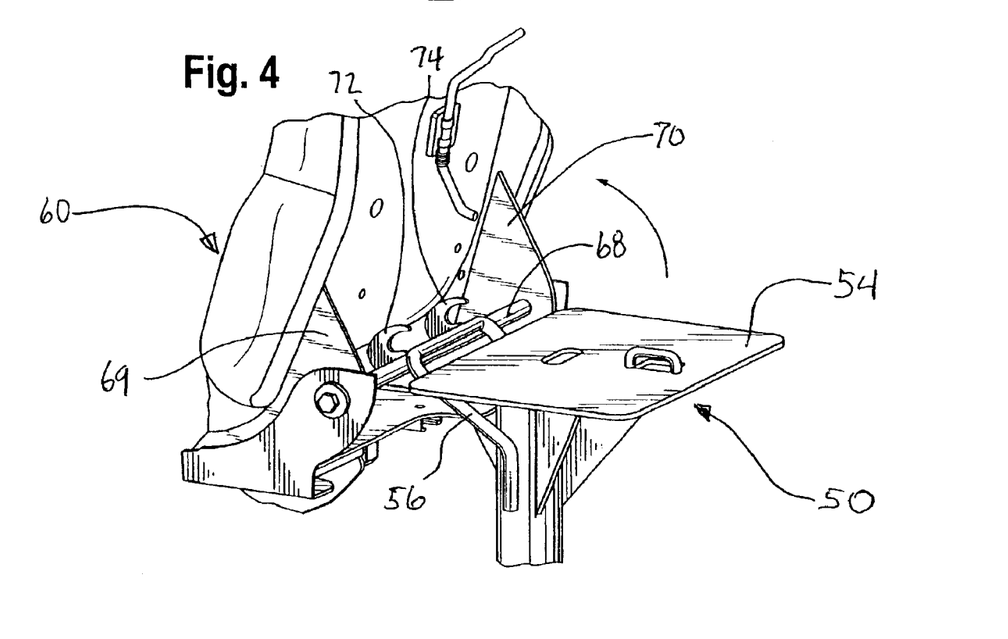
FIG. 4 is a perspective view showing details of the second suspension and the seat assembly.

With reference to FIGS. 1 and 2, the seat apparatus of the present invention is designated generally as 20 and finds particularly advantageous use in a dual purpose off-the-road vehicle 30. In accord with the present invention, seat apparatus 20 is designed to facilitate operation of vehicle 30 with the operator facing either end of the vehicle; in a first orientation the operator faces the front or loader end of the vehicle, as shown in FIG. 1; and in the second orientation the operator faces the rear or backhoe end of the vehicle, as shown in FIG. 2.

One preferred embodiment of the present invention and details of its construction are illustrated in FIGS. 3–8.

Vehicle seat apparatus 20 includes three basic components: a first suspension 40, a second suspension 50, and a seat assembly 60.

First suspension 40 is located at a first longitudinal point on vehicle 30 and, as illustrated, may take the form of a conventional scissors type suspension well known to those of skill in the art. The uppermost component of suspension 40 comprises a plate or seat platform 42 which, by virtue of the suspension design, can travel vertically through a range of about four to five inches and may be adjusted horizontally, in the fore/aft direction, by as much as about six inches. Suspension designs of a type suitable for these purposes are illustrated in U.S. Pat. Nos. 4,183,493; 4,856,763; 5,580,027; 5,584,460; 5,720,462; and 5,957,426. The disclosures of these United States patents are incorporated herein by reference.

Second suspension 50 is located at a second longitudinal point on vehicle 30 and, in the illustrated embodiment, comprises a fixed pedestal having a post 52 which supports a second seat platform 54 and a pivot bracket 56.

The seat assembly 60 includes first and second occupant support members 62 and 64, preferably upholstered cushions, which are mounted to a frame or back pan 66. The seat assembly 60 also includes a pivot rod 68 which is connected in fixed relation, relative to the occupant support members 62 and 64, by means of brackets 69 and 70. A pair of latch cams 72 and 74 is mounted to pivot rod 68. Finally, seat assembly 60 also is provided with a suitable safety harness such as a conventional seat belt restraint device 76.

The first seat platform 42 has upstanding side brackets 80 and 82, each of which includes an aperture 84. The seat assembly 60 is rotationally mounted to seat platform 42 by means of end bolts 86 which extend through the apertures 84 and are threaded into the opposite ends of pivot rod 68. In accordance with the preferred embodiment of the invention, the apertures 84 have a size and configuration to permit not only rotational movement of the seat assembly relative to seat platform 42, but vertical and horizontal movement as well.

Latch mechanisms are also provided to secure the seat assembly 60 to either of seat platforms 42 or 54. For this purpose, each of the platforms 42 and 54 are fitted with a seat latch bracket 88, and a latch subassembly 90 is provided on the underside of each occupant support member 62 and 64. The latch subassembly 90 includes a seat latch 92, a latch release lever 94, a latch lock bar 96, and a biasing spring 98.

Figure 5:
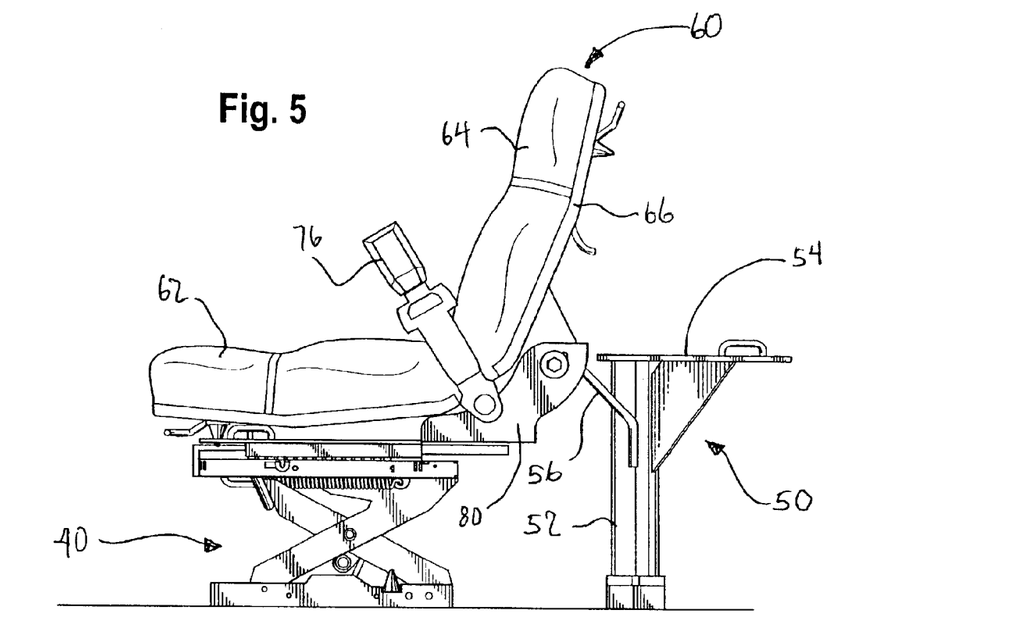
FIG. 5 is a side view of a preferred embodiment of the present invention with the seat assembly in a first orientation and the seat facing toward the loader end of the vehicle.
Figure 6:
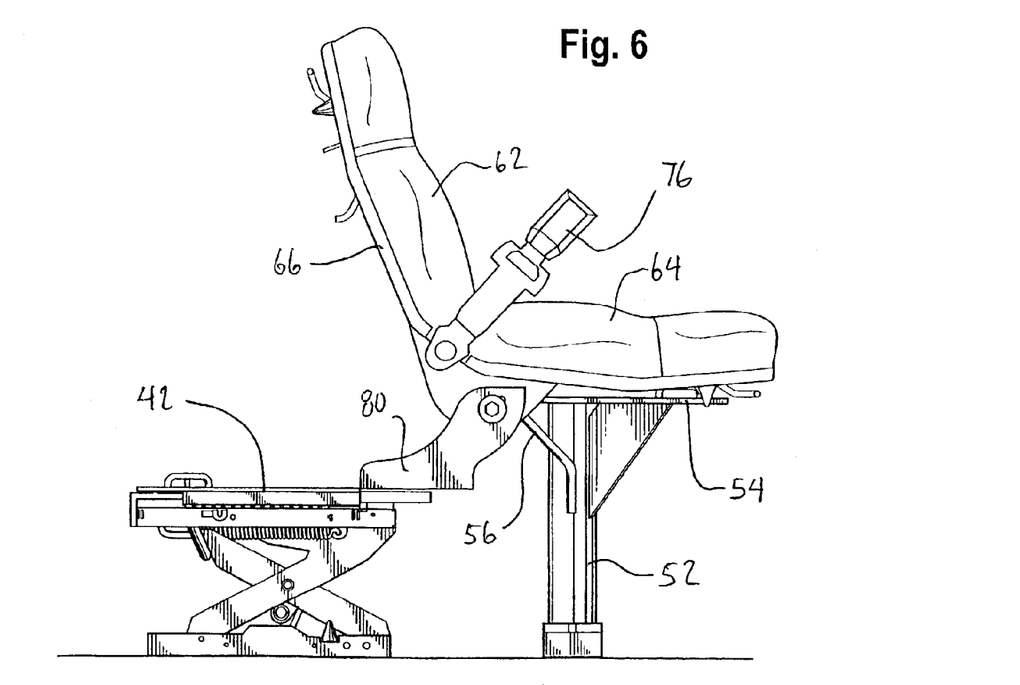
FIG. 6 is a side view of the same embodiment as shown in FIG. 5 but with the seat assembly in a second orientation and the seat facing the backhoe end of the vehicle.
Figures 7, 8:
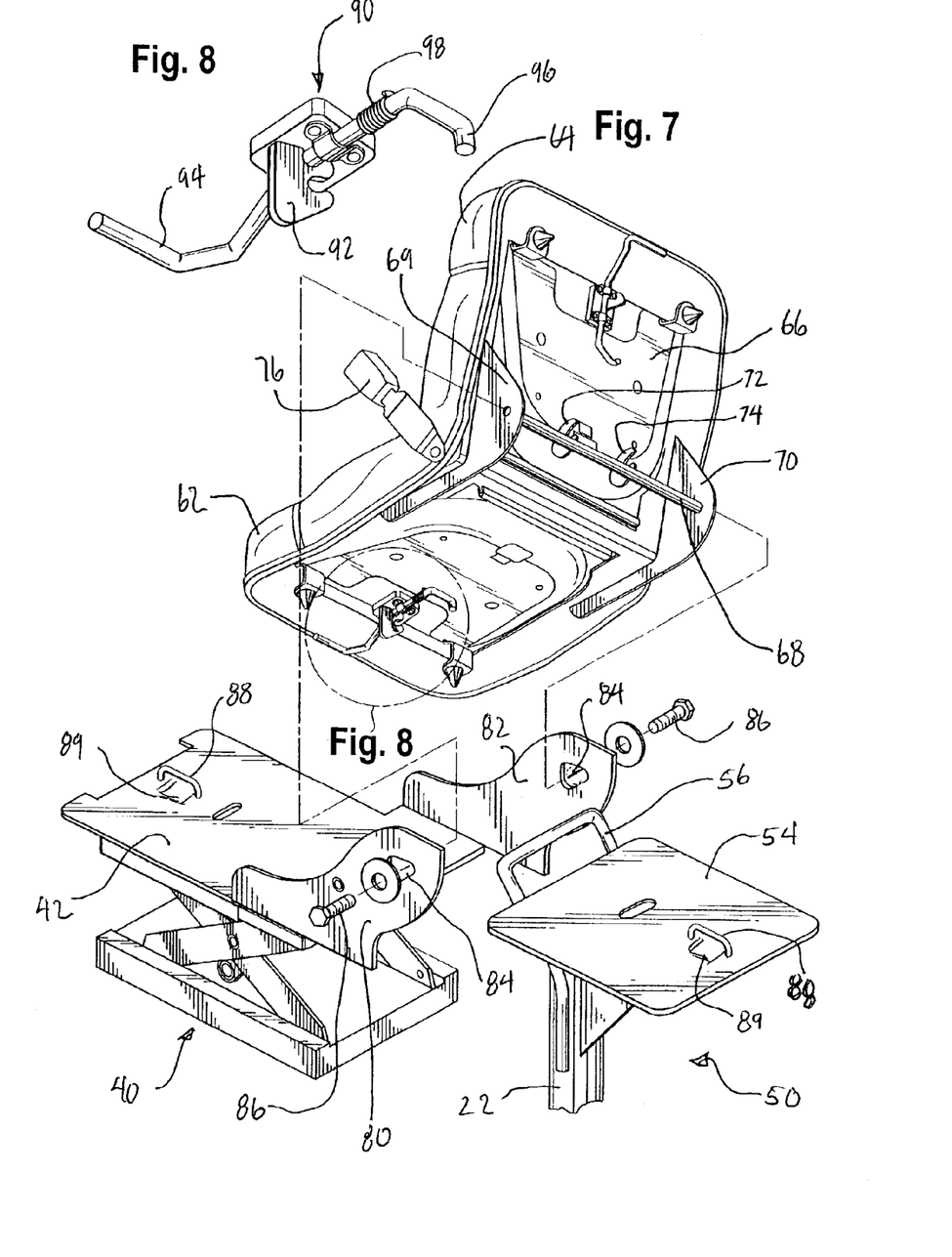
FIG. 7 is an exploded perspective view illustrating further construction details of the seat assembly and first and second suspensions employed in one of the preferred embodiments.
FIG. 8 is an enlarged perspective view showing details of a preferred seat latch and release lever used in the embodiment illustrated in FIG. 7.
Figure 9:
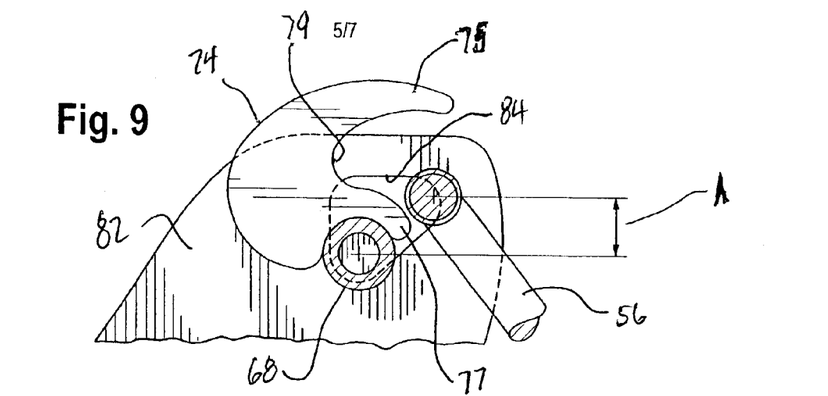
FIGS. 9–12 are partial side views showing the cooperation between components of the first and second suspensions and components of the seat assembly for one preferred embodiment of the invention.
Figure 10:
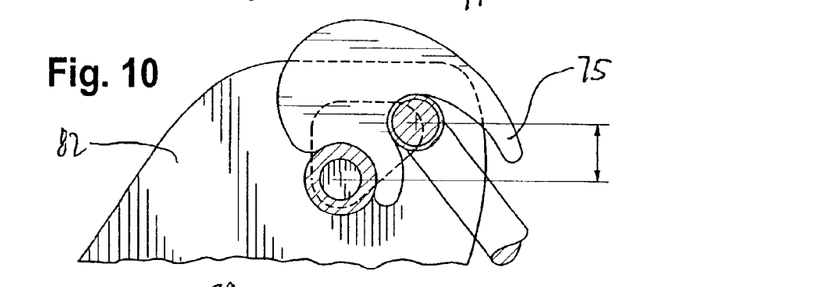
Figure 11:
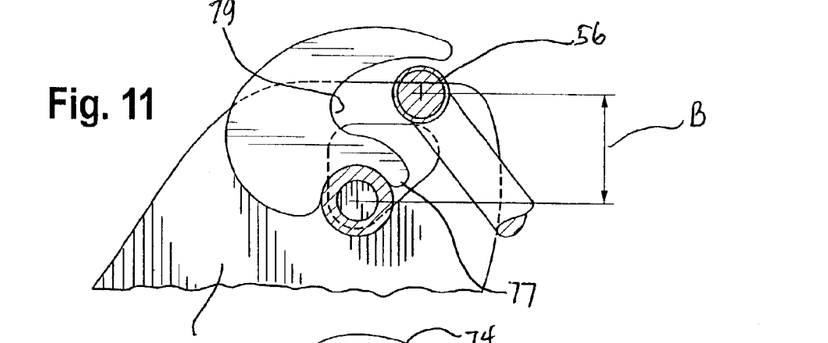
Figure 12:
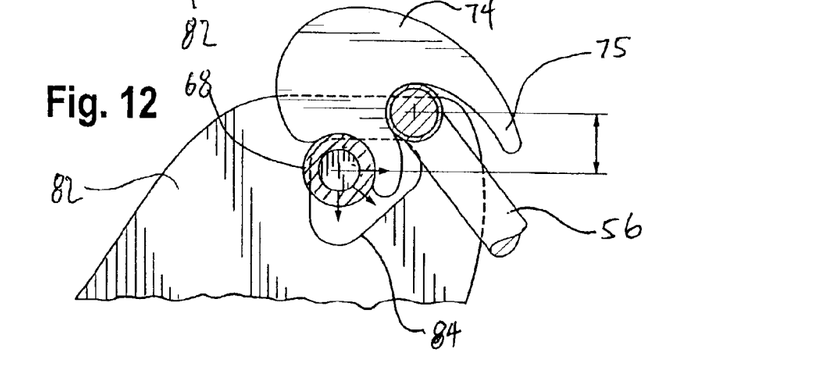
Figure 13:
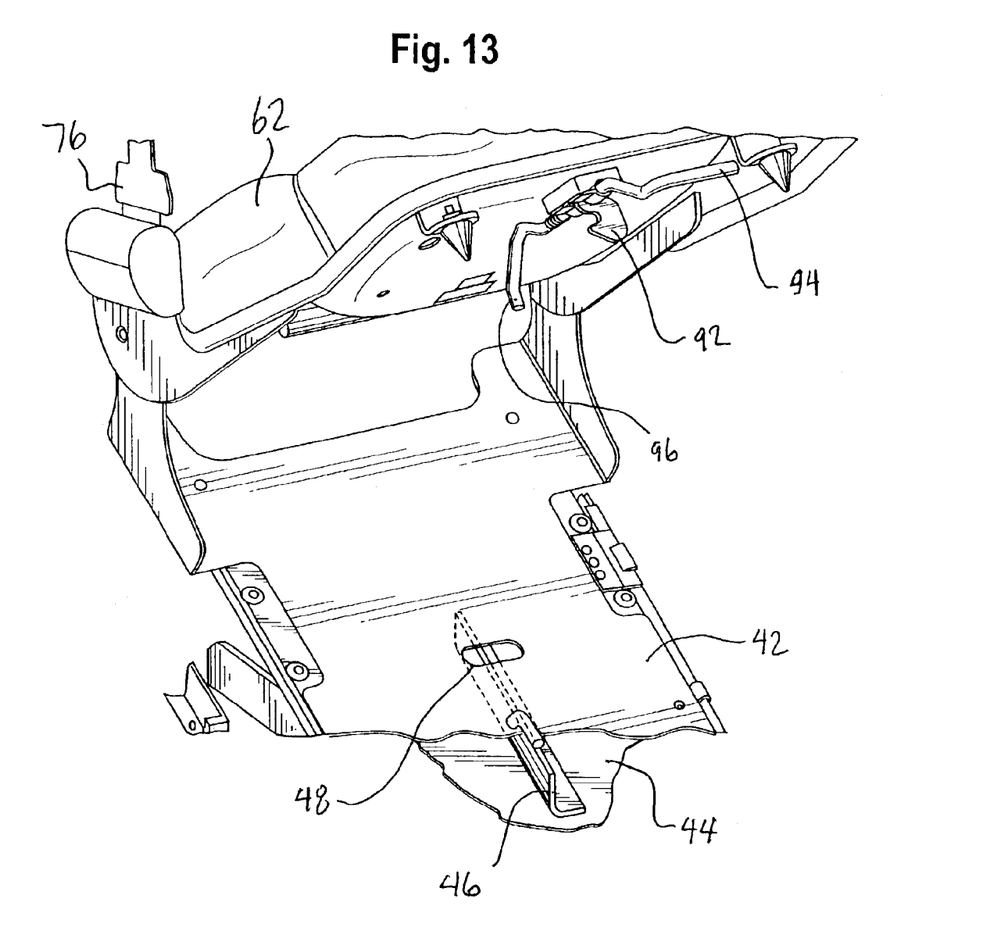
FIGS. 13–17 are still further perspective views illustrating the interrelationship between latch components of the seat assembly and cooperating latch components of the first suspension as employed in one of the preferred embodiments.
Figure 14:
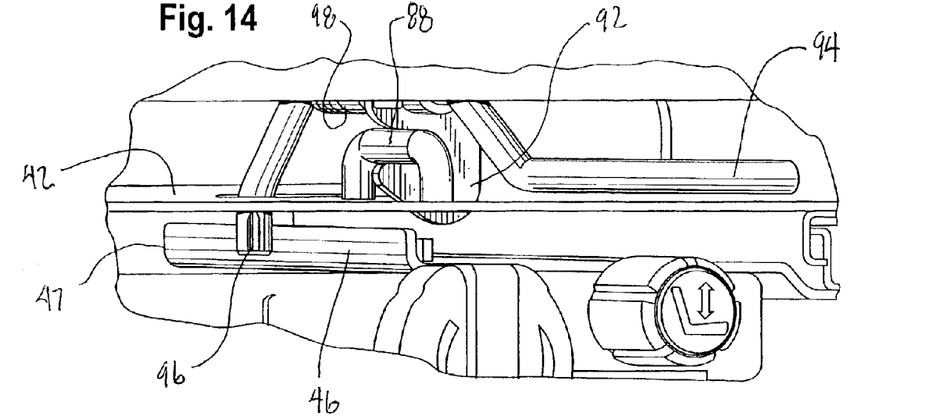
Figure 15:
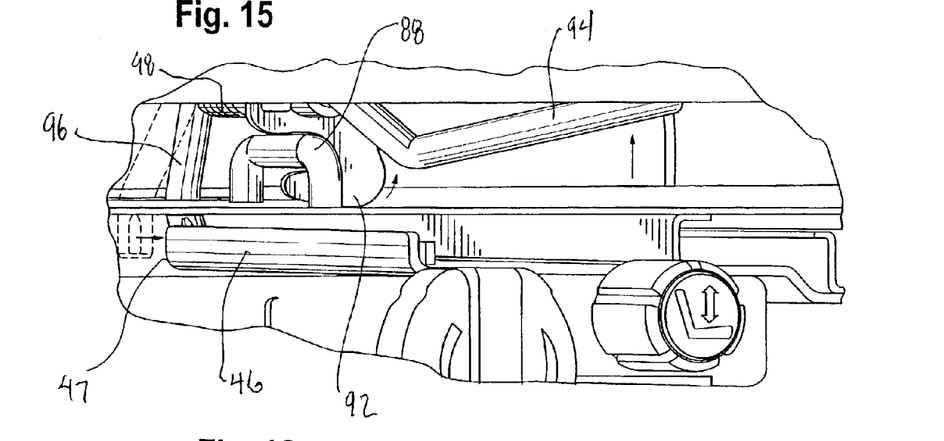
Figure 16:
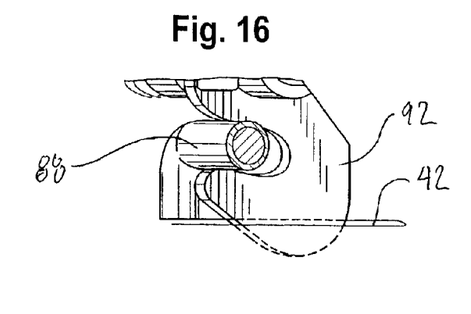
Figure 17:
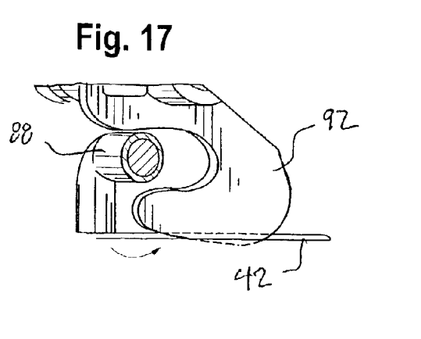

When the seat latch 92 is disengaged from bracket 88, the entire seat assembly 60 may be rotated from the first orientation illustrated in FIGS. 1 and 5 to the second orientation illustrated in FIGS. 2 and 6, or from the second orientation back to the first. AS the seat assembly rotates from the first orientation to the second orientation, the latch cams 72 and 74 engage the fixed pivot bracket 56 to properly position the seat assembly 60 on second suspension 50. The interrelationsip and cooperation between latch cams 72 and 74 and the pivot bracket 54 are shown in FIGS. 9–12. As noted above, apertures 84 in side brackets 80 and 82 are configured to accommodate a range of motion between seat assembly 60 and the first suspension 40. In the preferred embodiment, the apertures 84 have a generally triangular configuration. In addition, latch cams 72 and 74 have extending projections 75 and 77 which together define a tapered recess 79. These structures assure the proper engagement of pivot bracket 56 within the recess 79 of the latch cams regardless of the vertical location of first seat platform 42 and the associated seat assembly 60 as the seat assembly is rotated to the second orientation. This is illustrated by the arrow A in FIG. 9 as compared with the arrow B in FIG. 11; this depicts a situation where the vertical position of the seat assembly 60 is higher in FIG. 9 than FIG. 11, but the final position of the seat assembly 60 and the second seat platform bracket 54 is nonetheless established in both cases as illustrated in FIGS. 10 and 12.

Another feature of the present invention is the ability to adjust the seat assembly 60 in the fore/aft direction while assembled to the first suspension 40 and yet assure proper positioning of the seat assembly 60 when it is desired to change from the first orientation to the second. The structural components which accomplish this objective in accordance with the preferred embodiment are illustrated in FIGS. 13–17.

The first seat platform 42 is designed to slide either forward or rearward over the fixed upper frame 44 of the first suspension 40 in a manner well known to those of skill in the art. Upper frame 44 includes a stationary flange 46, and the first seat platform 42 includes a lock bar slot 48. When the seat assembly 60 is located in the first orientation on the first seat platform 42, the latch 92 engages bracket 88 and the latch lock bar 96 extends through slot 48 to a point adjacent flange 46. Spring 98 biases the latch 92 to the engaged position shown in FIG. 14. In accordance with the present invention, latch 92 may only be disengaged from bracket 88 by upward rotation of the release lever 94 when the seat assembly 60 is in the most rearward fore/aft adjustment position. It is only when the seat assembly is so situated that the latch lock bar 96 clears the rear end 47 of flange 46, permitting the release lever 94 to be activated and the latch 92 to disengage from bracket 88.

It will be appreciated by those skilled in the art that various changes and modifications can be made to the illustrated embodiments without departing from the spirit of the present invention. All such modifications and changes are intended to be covered by the appended claims.

We claim:

1. A vehicle seat apparatus to permit a vehicle operator to occupy a seat in either of two positions facing toward opposite ends of a vehicle, said apparatus comprising:

a first suspension located at a first longitudinal location on the vehicle, the first suspension having a first seat platform capable of vertical and fore/aft movement, the first seat platform also including a pair of seat brackets;

a second suspension located at a second longitudinal location on the vehicle, the second suspension having a second seat platform including a pivot bracket mounted in fixed relation relative to the second seat platform;

a seat assembly having first and second seat occupant support members and a generally horizontal pivot rod mounted in fixed relation relative to said support members;

the seat assembly being rotationally mounted to the seat brackets to permit rotation of the seat assembly from a first orientation in cooperation with the first suspension wherein the seat occupant faces one end of the vehicle to a second orientation in cooperation with the second suspension wherein the seat occupant faces the other end of the vehicle;

at least one latch cam associated with the seat assembly pivot rod, the latch cam being engageable with the second suspension pivot bracket as the seat assembly is rotated from the first orientation to the second orientation; and wherein the seat assembly is mounted via the seat brackets to permit rotational, vertical and horizontal movement of the seat assembly relative to the first seat platform.

2. The vehicle seat apparatus of claim 1 further comprising first and second seat latch brackets associated with the first and second seat platforms and first and second seat latches and seat latch release levers associated with the two occupant support members, whereby the seat assembly may be releaseably secured to either of the first or second seat platforms.

3. The vehicle seat apparatus of claim 2 further comprising a lock flange associated with the first suspension and lock bar associated with at least the first seat latch release lever, whereby the first seat latch is disengageable from the first seat latch bracket only when the seat assembly and first seat platform are at a predetermined rearward location relative to the first seat suspension.

4. The vehicle seat apparatus of claim 1 wherein the seat brackets each include a pivot rod aperture, and said apertures cooperate with the seat assembly pivot rod to permit rotation of the seat assembly, said apertures also having a generally triangular configuration to permit the vertical and horizontal movement of the seat assembly relative to the first seat platform.

* * * * *